F. C. LAVARACK.
BONDING PIN.
APPLICATION FILED OCT. 22, 1913.
1,097,340.
Patented May 19, 1914.
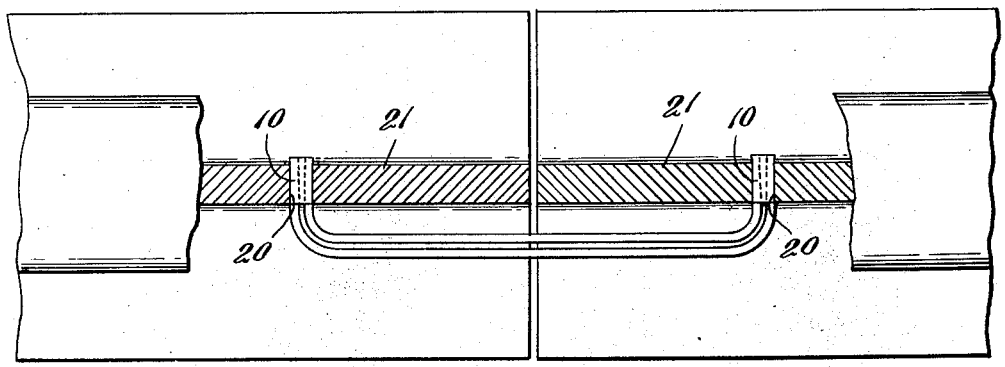
Fig. 1.
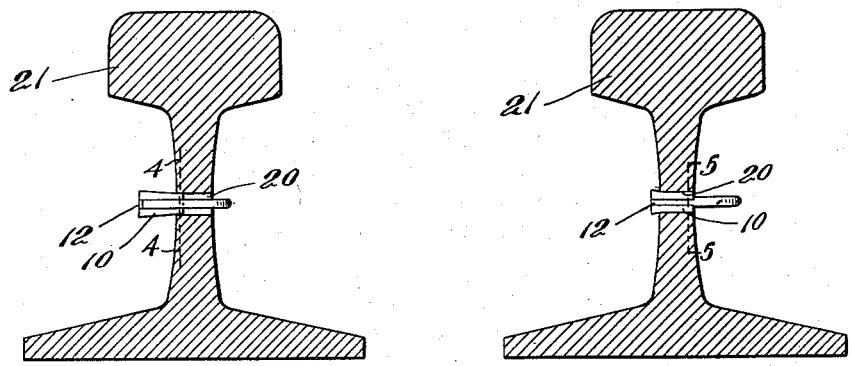
Fig. 2.   Fig. 3.
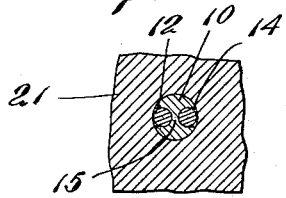  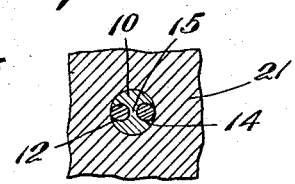
Fig. 4.   Fig. 6.   Fig. 5.
Fig. 7.
Fig. 8.
Witnesses:
H. B. Davis.
C. Doyle
Inventor:
Frederick C. Lavarack
by Hayes & Harriman
Attys.

UNITED STATES PATENT OFFICE.

FREDERICK C. LAVARACK, OF ORANGE, NEW JERSEY.

BONDING-PIN.

1,097,340.

Specification of Letters Patent.

Patented May 19, 1914.

Application filed October 22, 1913. Serial No. 796,715.

*To all whom it may concern:*

Be it known that I, FREDERICK C. LAVARACK, a subject of Great Britain, residing at Orange, in the county of Essex and State of New Jersey, have invented an Improvement in Bonding-Pins, of which the following is a specification.

This invention relates to bonding-pins for the attachment of bond-wires to rails, and has for its object the construction of an improved form of bonding-pin adapted for attaching the ends of two bond-wires to a rail to reduce the expense of double-bonding the rails, to more securely hold the bond-wires and insure a better contact.

My improved form of bonding-pin is made tapering and has wire-receiving grooves in its opposite sides of such depth that the waist-portion between them is weakened sufficiently to admit of transverse compression of the pin, thereby to cause the walls of the grooves to more tightly and uniformly impinge the end-portions of the bond-wires, and thus more securely hold them and insure a better contact.

Figure 1 is a longitudinal transverse section of the end-portions of two rails, and bonding-pins embodying this invention driven into them, together with two bond-wires. Fig. 2 is a transverse vertical section of one of the rails and bonding-pin placed therein. Fig. 3 is a view similar to Fig. 2, the bonding-pin being driven into a hole in the rail. Fig. 4 is an enlarged sectional view, taken on the dotted line 4—4, Fig. 2. Fig. 5 is an enlarged sectional view, taken on the dotted line 5—5, Fig. 3. Fig. 6 is a side elevation of the bonding-pin. Fig. 7 is a longitudinal vertical section of the bonding-pin. Fig. 8 is a perspective view of the bonding-pin.

10 represents the tapering bonding-pin, which may be made of any desired dimensions and preferably has an extra taper at its smaller end-portion. Two wire-receiving grooves 12, 14, are extended throughout the length of said pin, which are arranged at opposite sides of it, and said grooves are or may be formed with parallel sides and of a gradually increasing depth, in a direction from the smaller to the larger end, so as to provide a weakened waist-portion 15 between them, throughout the length of the pin. It is designed and intended that two bond-wires shall be arranged in the grooves in the pin, and the pin driven into a hole 20 in the rail 21, and when so driven the pin is compressed transversely by reason of its weakened waist-portion, so that the walls of the grooves more firmly engage the end-portions of the bond-wires, and uniformly pinch said wires throughout the length of the pin, and results in the bond-wires being more securely held, and a better contact insured.

On account of the pin being made tapering the grooves are formed of a gradually increasing depth, so as to insure a weakened waist-portion throughout the entire length of the pin; but should the waist-portion be weakened for a distance less than the entire length of the pin a great advantage is gained, as the wire is more tightly engaged by all that portion of the pin which is transversely compressed.

I claim:—

1. The bonding-pin herein described consisting of a tapering pin having two wire-receiving grooves formed in its opposite sides which are extended throughout its length, and made of a depth to provide a weak waist-portion between them, admitting of transverse compression of the pin when driven into the rail and consequent extra impingement of the walls of the grooves upon the end-portions of the bond-wires, substantially as described.

2. The bonding-pin herein described consisting of a tapering pin having two wire-receiving grooves formed in its opposite sides, throughout its length, and of a gradually increasing depth from the smaller to the larger end thereof, admitting of transverse compression of the pin throughout its length when driven into the rail to secure a uniform impingement of the bottom of the grooves upon the end-portions of the bond-wires, substantially as described.

In testimony whereof, I have signed my name to this specification, in the presence of two subscribing witnesses.

FREDERICK C. LAVARACK.

Witnesses:
A. M. LINDENSTRUTH,
GEO. J. GRAF.